No. 832,048. PATENTED OCT. 2, 1906.
A. J. ERICSSON.
CENTRIFUGAL MACHINE.
APPLICATION FILED OCT. 20, 1905.

2 SHEETS—SHEET 1.

WITNESSES:—
M. M. Hamilton
Thornley B. Wood

INVENTOR:—
Anders Johan Ericsson
BY Harding + Harding
ATTORNEYS.

No. 832,048. PATENTED OCT. 2, 1906.
A. J. ERICSSON.
CENTRIFUGAL MACHINE.
APPLICATION FILED OCT. 20, 1905.

2 SHEETS—SHEET 2.

Witnesses:
Henry Drury
M. M. Hamilton

Inventor:
Anders Johan Ericsson
by Harding & Harding
Attorneys

UNITED STATES PATENT OFFICE.

ANDERS JOHAN ERICSSON, OF STOCKHOLM, SWEDEN, ASSIGNOR TO AKTIEBOLAGET SEPARATOR, OF STOCKHOLM, SWEDEN.

CENTRIFUGAL MACHINE.

No. 832,048.      Specification of Letters Patent.      Patented Oct. 2, 1906.

Application filed October 20, 1905. Serial No. 283,566.

*To all whom it may concern:*

Be it known that I, ANDERS JOHAN ERICSSON, a subject of the King of Sweden, residing at Stockholm, Sweden, have invented a new and useful Improvement in Centrifugal Machines for Separating Solid Matters from Liquids, of which the following is a full, clear, and exact description, reference being had to the accompanying drawings, which form a part of this specification.

My present invention relates to centrifugal machines for separating solid matter from liquids, and more especially to machines of that kind wherein the solids stratifying on the inner walls of the bowl are brought transversely through the layer of liquid to a point within the same nearer the center of the bowl by means of scraper-wheels rotating on shafts projecting from the bottom of the bowl and rotated from a separate shaft.

With centrifugal machines of this kind the inconvenience arises that the scrapers, which always pass the same points of the periphery of the bowl, bring with them the solids which have stratified at such points only, while the solids at the other points of the periphery are not brought away.

My present invention has for its object to transport the solids stratifying at the bottom of the bowl if the latter be of conical shape or conveyed to this bottom by any suitable means if the bowl be of cylindrical shape in the direction of the periphery to the points above the scraper-wheels, whence their own gravity compels them to fall down on the scraper-wheels, which will then carry them away to the center of the bowl, whence they escape outside the bowl. This transportation of the solids in the direction of the periphery is performed by means of other scrapers rotating relatively to the bowl, which during their rotation catch up the solids and carry them along the periphery of the bowl to the points above the scraper-wheels.

My invention is shown in the annexed drawings, in which—

Figure 1:
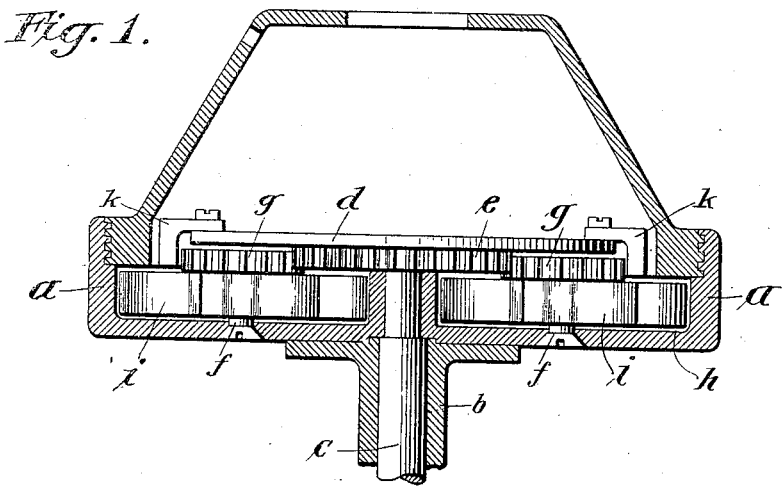
Figure 2:
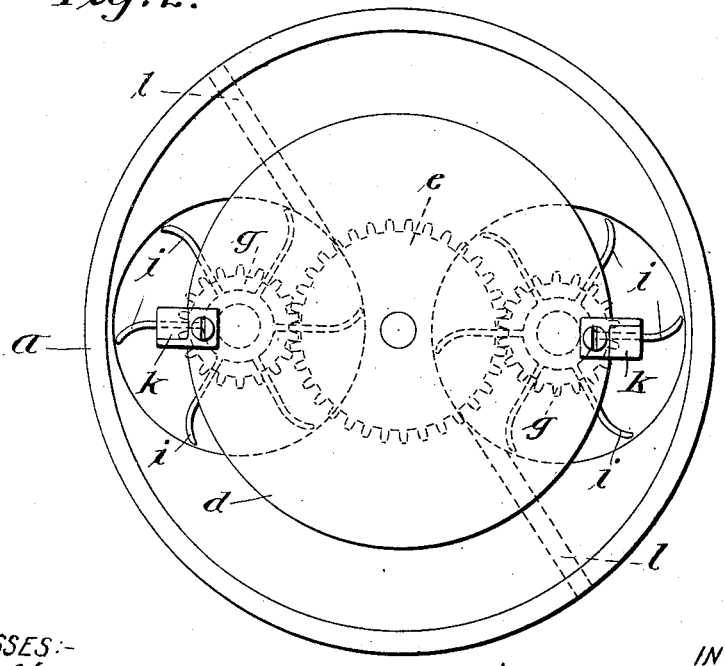

Figure 1 shows a centrifugal bowl in vertical section with my improved device applied thereto. Fig. 2 is a plan view of the bowl of Fig. 1 with the cover omitted, and Fig. 3 shows a centrifugal bowl of cylindrical shape in which the solids are brought down to the bottom by inclined scrapers.

$a$ is the centrifugal bowl, mounted on the top of the hollow driving-shaft $b$, within which a massive shaft $c$ is arranged that should be rotated with a speed different from that of the shaft $b$. On the top of shaft $c$ a cross-piece, which may take the form, as shown, of a disk $d$, is mounted, to the under side of which a cog-wheel $e$ is secured. This cog-wheel $e$ meshes with two cog-wheels $g$, which run loosely on the shafts $f$, projecting from the bottom of the bowl. Said cog-wheels $g$ are secured to the scraper-wheels $i$, which rotate in cylindrical borings in the bottom of the bowl. To the ends of the cross-piece or suitably on two diametrically situated points of the disk $d$ scrapers $k$ are secured. Said scrapers are rotated by means of the shaft $c$ at a speed different from that of the bowl, so that they move along the periphery of the bowl, thereby carrying the solids along said periphery. These solids have glided along the conical wall of the bowl down to the bottom, where the scrapers $k$ operate.

Figure 3:
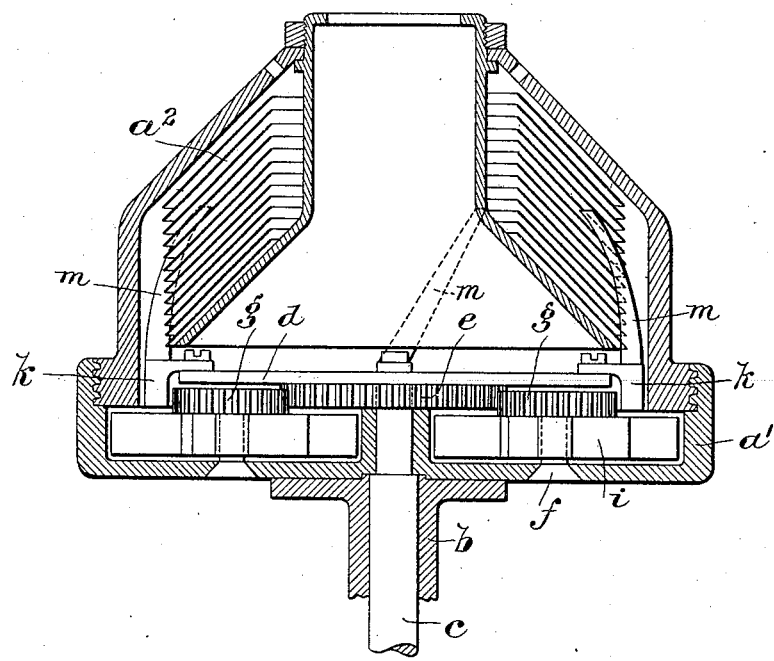

If the bowl has a cylindrical shape, the solids are brought down to said bottom by some suitable means, one example of which is shown in Fig. 3. In this figure, $a'$ represents a cylindrical bowl provided with a liner $a^2$, this bowl being of a well-known type. The rotated parts shown in Figs. 1 and 2 are duplicated in the bowl of Fig. 3 and are represented by the same reference-letters, the only change being the addition of inclined scrapers $m$, secured to or integral with scrapers $k$, for transporting the solids down the cylindrical wall.

When the solids are carried along the periphery of the bowl, they instantly on account of their own gravity fall down on the scrapers $i$ and are then transported transversely through the layer of liquid to the discharge-tubes $l$, through which they escape outside the bowl.

It is necessary in the specific machine shown that the shafts $b$ and $c$ rotate relatively to each other, as otherwise the wheels $i$ would not rotate on their shafts, nor would the scrapers $k$ move along the periphery of the bowl, both of which are essential functions of the machine.

Having now fully described my invention, what I claim, and desire to protect by Letters Patent, is—

1. In a centrifugal machine for separating solids from liquids, the combination with a bowl and its driving-shaft, and scraper-wheels and their separate driving-shaft, said scraper-wheels being adapted to carry the solids brought down to the bottom of the bowl toward the center of the bowl, of one or more scrapers arranged above said scraper-wheels and driven from said separate shaft and thereby caused to move along the inner wall of the bowl and to transport the solids along said inner wall in a circumferential direction to points above the scraper-wheels.

2. In a centrifugal machine for separating solids from liquids, the combination with a rotary bowl, of means located within the bowl for conveying the solid matter to a point nearer the center line of the bowl, and independent means located within the bowl and working along the inner wall of the bowl in a circumferential direction for conveying the solid matter stratified on the wall in a circumferential direction to the first-named means, the last-named means being constructed to rotate at a speed different from that of the bowl.

3. In a centrifugal machine for separating solids from liquids, the combination with a rotary bowl having one or more outlets for the solid matter, of one or more scrapers located within the bowl for transporting the solid matter along the inner wall of the bowl in a circumferential direction, and independent means located within the bowl beneath said scrapers adapted to receive the solid matter so transported and convey it to said outlet.

4. In a centrifugal machine for separating solids from liquids, the combination with a rotary bowl, of scraper-wheels within the bowl movable bodily with the bowl but having a rotary movement on their axes, and one or more scrapers within the bowl and working along the inner wall of the bowl in a circumferential direction for transporting the solid matter to the scraper-wheels.

5. In a centrifugal machine for separating solids from liquids, the combination with a rotary bowl, of rotary scraper-wheels within the bowl whose axes are fixed relatively to the bowl, one or more scrapers within the bowl adapted to work along its periphery and transport solid matter to the scraper-wheels, the hollow driving-shaft of the bowl, a separate shaft extending through the hollow shaft of the bowl, and driving connections from the separate shaft to the scrapers and scraper-wheels.

6. In a centrifugal machine for separating solids from liquids, the combination with a rotary bowl, of rotary scraper-wheels within the bowl whose axes are fixed relatively to the bowl, one or more scrapers within the bowl above the scraper-wheels, adapted to work along its periphery and transport solid matter to the scraper-wheels, the hollow driving-shaft of the bowl, a separate shaft extending through the hollow shaft of the bowl, a cross-piece carrying the scrapers and secured to the separate shaft, a cog-wheel rotating with the separate shaft, and cog-wheels connected to the scraping-wheels and driven by the first-named cog-wheel.

7. In a centrifugal machine for separating solids from liquids, the combination with a rotary bowl and its hollow driving-shaft, of a separate shaft extending through the hollow shaft, a cross-piece secured thereto, one or more scrapers secured to the cross-piece adapted to work along its periphery, a cog-wheel under the cross-piece and rotating with the separate shaft, shafts projecting upwardly from the bottom of the bowl, scraper-wheels rotatable loosely on said shafts, cog-wheels secured to and above the scraper-wheels, the last-named cog-wheels engaging and being driven by the first-named cog-wheel.

8. In a centrifugal machine for separating solids from liquids, the combination with a rotary bowl, having an outlet for the solids, of scraper-wheels within the bowl located outside the axis of the bowl and having a movement on their axes and adapted to transport the solids to said outlet, and one or more scrapers within the bowl and movable relatively to both the bowl and the scraper-wheels for transporting the solid matter stratified along the inner wall of bowl in a circumferential direction to points above the scraper-wheels.

In testimony of which invention I have hereunto set my hand, at Stockholm, Sweden, on this 5th day of October, 1905.

ANDERS JOHAN ERICSSON.

Witnesses:
    HARRY FREDRIK ALBIHN,
    CARL FRIBERG.